F. S. DICKINSON AND J. SPRINGER.
METHOD OF CONSTRUCTING PNEUMATIC TIRES.
APPLICATION FILED AUG. 16, 1916. RENEWED MAR. 18, 1921.
1,394,069.
Patented Oct. 18, 1921.
2 SHEETS—SHEET 1.
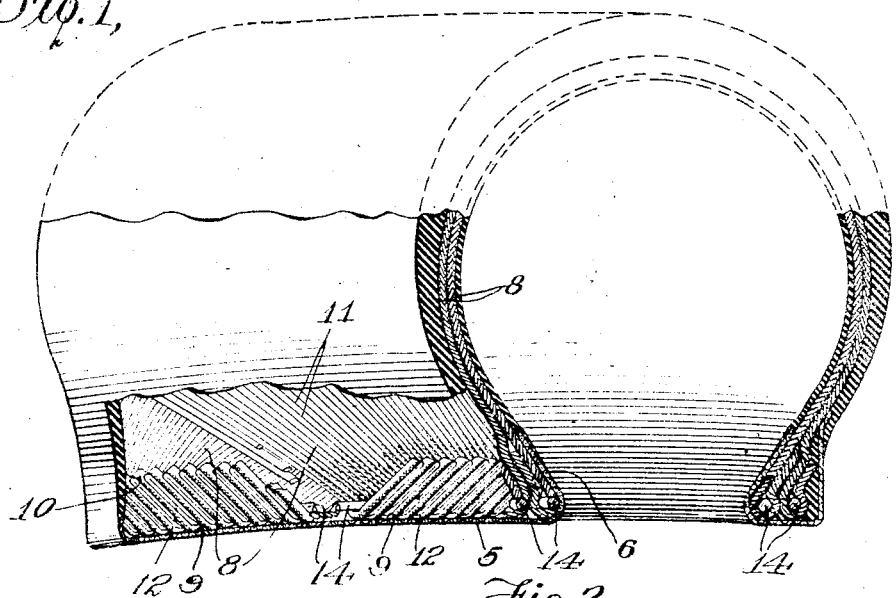
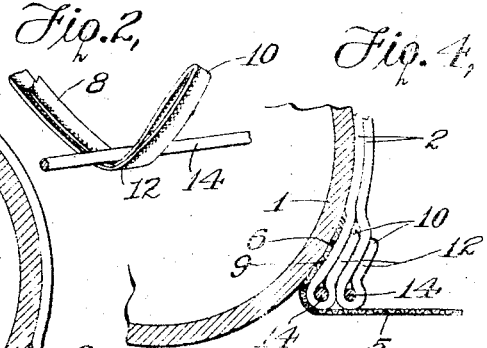
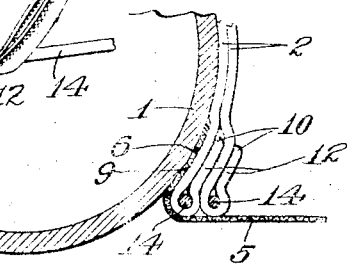
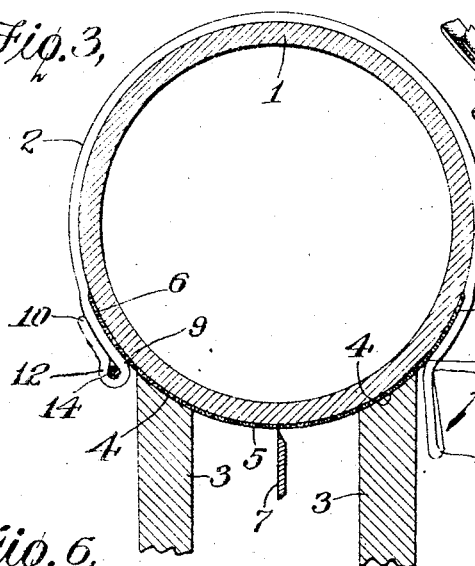
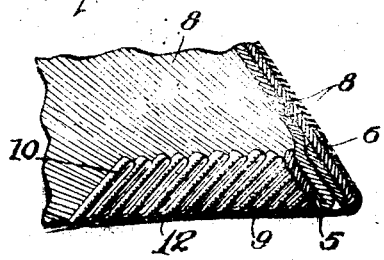
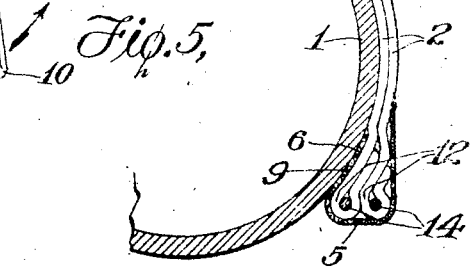

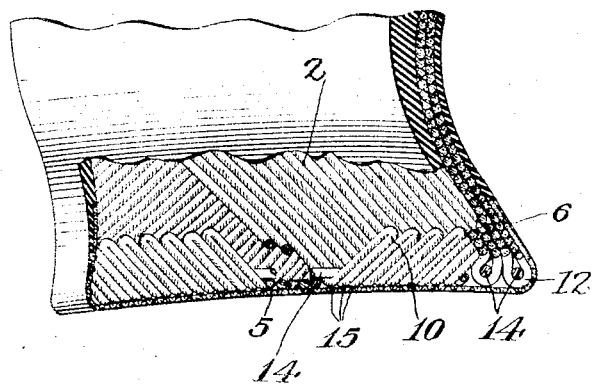
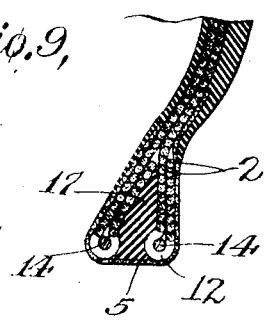
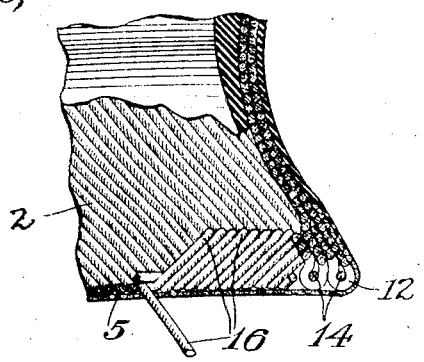
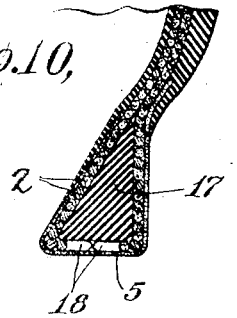
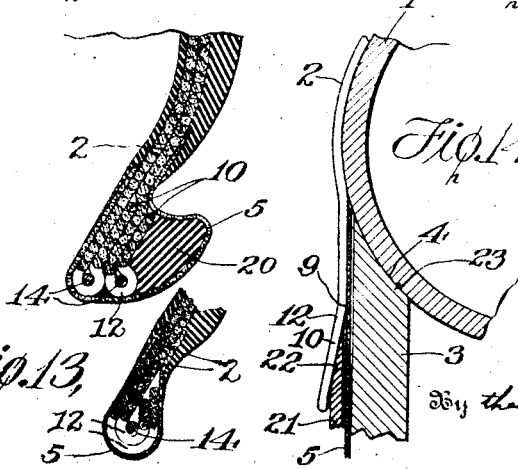
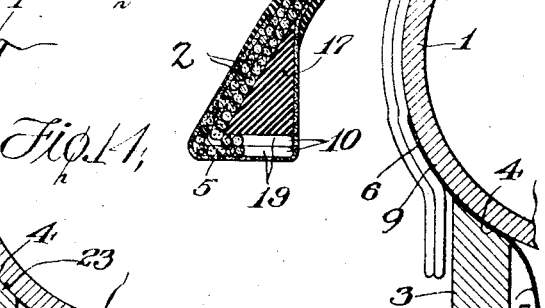

UNITED STATES PATENT OFFICE.

FREDRICK S. DICKINSON, OF NEW YORK, N. Y., AND JOHN SPRINGER, OF BRADLEY BEACH, NEW JERSEY, ASSIGNORS TO SAID DICKINSON.

METHOD OF CONSTRUCTING PNEUMATIC TIRES.

1,394,069.   Specification of Letters Patent.   Patented Oct. 18, 1921.

Application filed August 16, 1916, Serial No. 115,138. Renewed March 18, 1921. Serial No. 453,476.

*To all whom it may concern:*

Be it known that we, FREDRICK S. DICKINSON, a resident of New York, in the county and State of New York, and JOHN SPRINGER, a resident of Bradley Beach, in the county of Monmouth and State of New Jersey, both citizens of the United States, have invented certain new and useful Improvements in Methods of Constructing Pneumatic Tires, of which the following is a specification.

This invention relates to methods of constructing pneumatic tires such as are now commonly used upon automobiles and other vehicles and which comprise an elastic shoe or casing which constitutes the outer portion and tread of the tire and incloses the inner air tube and which has an internal body fabric or carcass formed by cords or threads.

Under the ordinary methods of constructing cord or thread-fabric tires of the type above set forth, except such methods as provide an individual anchorage means for each cord at the bead-edge, it is usually impossible to lay and maintain the cords with the required initial tension applied during the act of laying, and under circumstances where the required initial tension is accomplished in the laying of the cords the lack of proper anchorage means results in a release of such tension during the subsequent process of vulcanizing the carcass. This results from the fact that during vulcanization the heat causes the caoutchouc or rubber, which forms the cohesive bond under which the cords or threads were laid in building up the carcass, to flow and thus destroy or impair the effect of the cohesive bond, under which action the tension is released by slippage of the cords or threads in their tendency to assume their normal length.

Our present improved method of constructing cord or thread-fabric tires is designed to effectively overcome the disadvantages and difficulties above set forth and as heretofore experienced in the manufacture of tires of this type, and to provide a simple, efficient and economical method of laying the cords or threads and securely maintaining the conditions of tension in which they are initially laid in building up the body fabric or carcass. Our improved method is adaptable to cords of either flat or round cross-section and also to so-called thread-fabrics of the types variously employed in tires of the class to which our improvements relate.

In the drawings—

Figure 1 is a perspective view, partly in section, illustrating a portion of a tire having two plies of cord laid according to our invention.

Fig. 2 is a detail perspective view illustrating the loop of the cord around a reinforcing ring at the bead-edge.

Fig. 3 is a cross-sectional view through the core over which the cords are laid, illustrating the laying of the cords with relation to the friction-fabric strips and flange-rings for retaining the latter.

Fig. 4 is a detail cross-section illustrating the lay of two plies of cords at the bead-edge with relation to the friction-fabric.

Fig. 5 is a detail cross-section corresponding to Fig. 4 and illustrating the final position of the friction-fabric with relation to the bead-edge.

Fig. 6 is a detail sectional view, on the plane of the annulus of the tire, illustrating the lay of the cord loops at the bead-edge without a reinforcing ring.

Fig. 7 is a detail perspective view, partly in section and similar to Fig. 1, of a portion of a tire, illustrating the laying of two plies with round cords.

Fig. 8 is a detail perspective view, partly in section and similar to Fig. 7, illustrating the laying of individual cords of single lengths.

Fig. 9 is a detail cross-section illustrating the insertion of a filler between the two plies of cords to enlarge the size of the bead.

Fig. 10 is a detail cross-section illustrating a modification in which the looped ends of the cords are folded at the bead-edge in lieu of being laid around a reinforcing ring.

Fig. 11 is a detail cross-section similar to Fig. 10 and illustrating a further modification in the method of laying the folded looped ends.

Fig. 12 is a detail cross-section illustrating the attachment of a bead-edge outside the laid cords to form a clencher tire construction.

Fig. 13 is a detail cross-section illustrating the employment of a single reinforcing bead-ring for a plurality of plies of cord.

Fig. 14 is a detail cross-sectional view similar to Fig. 3 and illustrating a modification in the method of laying the cords whereby the tension thereof may be increased over the tensional condition under which they are initially laid.

Fig. 15 is a detail cross-sectional view similar to Fig. 3 and illustrating a modification in the method of laying the friction-fabric strips in their operative relation to the cords.

Corresponding parts in all the figures are denoted by the same reference characters.

Referring to the drawings, 1 designates a core or mandril over which the cords or threads, 2, are laid, said core being annular and having a cross-sectional contour corresponding to the segmental cross-sectional contour of the tire body fabric or carcass. In carrying out our improved method, any suitable or adapted mechanism or mechanical means may be employed, other than that herein shown, but the preferred means comprise flange-rings, 3—3, which are suitably mounted in parallel position with their respective peripheries bearing with relation to the circumference of the annular core 1 at the inner side thereof and adjacent to the point at which the bead-edge of the tire is to be formed, the periphery of said rings being concave, as at 4, to correspond to the segmental curvature of the face of the core. These rings are suitably mounted so that they are retained in their bearing relation to the core during the operation of laying the cords, but are removable from their position with relation to the core after the cords are laid, for which purpose the rings may be formed of an assemblage of segmental sections as will be readily understood. The relative position of the core and flange-rings is such that the rings are respectively at opposite sides of the inner side of the core adjacent the terminal bead-edge of the tire fabric, as shown in Fig. 3.

In the method of constructing the cord or thread body fabric, as comprised in our present invention, a strip of friction-fabric, 5, is laid against the inner side of the core 1 and is held in position, with its outer side edges, 6—6, extending a short distance beyond the point of the toe of the bead-edge of the cord or thread fabric, by the respective flange-rings 3—3, the outer edges of which are at the point of the bead-toe, as shown in Fig. 3. This friction-fabric may be of any suitable character having the requisite adhesive quality, and we preferably employ the fabric which is commonly known in this art and which is frictioned by the application of caoutchouc or other compounds. We may employ a continuous strip of friction-fabric extending from side to side as shown in Fig. 3, which strip is adapted to be cut centrally at a point intermediate of the flange-rings 3—3, by means of a suitable cutting element (shown at 7, Fig. 3), to divide it into two respective strips for folding over the bead-edge formation of the cord or thread fabric after the latter is laid; or two separate strips of friction-fabric may be initially employed, the respective strips being positioned with relation to the core 1 and flange-rings 3 as shown in the modification illustrated in Fig. 15, each strip being of sufficient width to permit of its folding over the bead-edge formation, whereby the cutting or separation of a continuous strip as shown in Fig. 3 is obviated.

When flat cords are employed, in constructing the body fabric or carcass according to our method, the cords, 8, are laid over the core 1, preferably in a position diagonally or at an angle to the transverse plane of the tire (as shown in Fig. 1), and under the desired tension, with their laid portions at the bead-edge in contact, as at 9, with the friction-fabric strip 5, the cords being pressed to this contact to create an adhesive bond with the friction-fabric at the edge portion thereof which projects beyond the flange-ring 3 and from the toe of the bead. From this adhesive bond 9, the cord is carried down at the side of the flange-ring, and turned to produce a loop, 10, which is formed by laying the flat cord over itself (see Fig. 2) so that the portions of the cord at the loop lay parallel and each succeeding strand in the lay of the cord overlies the preceding strand and said strands relatively diverge in their overlapping or overlying position from the loop at the bead-edge in a continuous and gradual radial spread, as at 11 (see Fig. 1), to the tread portion of the tire. This gradual divergent or radial positional lay of the overlying strands of cord produces a body fabric in which the cords spread over and entirely cover the increasing progressive variable circumference of the tire between the bead and tread and thus completely cover the full area thereof with one lay or ply of the cords. The divergent positional lay of the overlying cords from the bead-edge, as just referred to and for the purpose stated, is similar to that covered by the method of laying cord fabric tires as set forth in the co-pending application of F. S. Dickinson Serial No. 10,667 and is not herein specifically claimed.

It will be understood that in forming the loops 10 the flange-ring 3 prevents cohesion between the loop of the cord and the friction-fabric 5 beyond the bead-toe, as shown in Fig. 3, and provides a templet to build to in the laying of the cord fabric and the formation of the loops. When the cord is laid and looped in the manner above described, the looped ends which extend at the side of the flange-ring are folded back from the bead-toe, as at 12, and laid against and in contact with the outer face of the end portions of the cords which are in contact with the friction-fabric strip 5, as shown in Figs. 1

1 and 6. The fold is at the extreme inner edge of the bead and the folded looped ends are preferably laid diagonally or obliquely with relation to the cross-sectional plane of the tire in a position approximately at right angles to the diagonally-laid main portion of the cords which are in contact with the friction-fabric, and the folded ends thus laid are preferably positioned so that their folds respectively overlie and contact with the next adjoining fold at an angle to the annulus of the tire. (See Fig. 1.)

A continuous length of cord is preferably employed in the laying of the cord in the manner above described to produce the body fabric or carcass, but it will be understood that separate strands of cord may be employed for the laying of the fabric, or that each strand passing from side to side may be a separate length of cord as will be hereinafter more fully described.

Under the positional conditions of the laid cords and looped ends as above set forth, there is frictional contact between each loop and between each loop and a series of strands of cord underlying the same, each loop diagonally crossing said series of strands, which conditions of multiple frictional contact serve to effectively prevent release of the tension under which the cords are laid. In this connection, it will be understood that the cords are preferably initially frictioned before laying by the application of caoutchouc or other suitable compound, or that the cords may be impregnated and coated as well with a friction compound. In addition to the frictional contact which prevents release of tension, the friction-fabric strips 5 effectually retain the initial tension under which the cords are laid before the formation and laying of the end loops 10, and furthermore the clamping action of the mold and core over the bead portion of the laid cords, when the laying is completed and the carcass is placed in the mold for vulcanization, operates against any slippage or release of the tension under which the cords are laid.

Th fold 12, beyond which the loop 10 is formed, is preferably made under and around a reinforcing ring, 14, at the bead-edge, which ring is an annular member or hoop of metallic wire or a plurality of wires or cable, or it may be of textile material or a combination of textile strands and wire combined with a caoutchouc filler. The operative relation of the reinforcing ring, inserted within the cord fabric as just described, is such that the bead is rendered inextensible and thus effectually precludes the forcing of the bead over the wheel rim edges when the tire is in service or use. But in the instance of tires, constructed according to the present invention, which are designed for use on rims of the non-detachable type, the reinforcing rings are preferably of a character which will afford an elastic limit sufficient to allow the bead to be stretched over the rim edge, in which circumstances the edge of the tire will be effectively constricted by inflation of the inner air tube and will thereby be held in permanent position with relation to the rim when in service or use.

When a plurality of plies or layers of the improved cord fabric are employed, an individual reinforcing ring 14 may be positioned in each ply, as illustrated in Figs. 1, 4, 5, and other of the multiple-ply views; but under some circumstances of preferred construction a single reinforcing ring may be employed in and for a plurality of plies, as illustrated in Fig. 13, the folds or bends 12 of each superposed ply being all turned around the single ring in one operation after the cords are laid in the manner hereinbefore described.

In the employment of a plurality of plies or layers, after the laying of the first ply, the succeeding ply is then laid in superposed postion thereon, and preferably at a reverse diagonal or oblique angle with relation to the under ply, as shown in Figs. 1 and 7. In Fig. 6, we have illustrated a modified construction, in which the cords are laid, according to our improved method and as shown in Fig. 1, without the insertion or employment of the reinforcing rings 14.

When the laying of the cord fabric is completed as above described, the friction-fabric strip 5 is released by the removal or withdrawal of the flange-rings 3 from their bearing relation to the core 1, and if a single strip is employed as shown in Fig. 3 it is then cut centrally intermediately between the flange-rings to divide it into two respective strips, whereas if the separate strips are initially employed as shown in Fig. 15 no cutting or division is necessary. The portion of the friction-fabric strip which is then free from its adhesive bond with the laid cords is folded outwardly-under the bead edge of the cords, as illustrated in Fig. 4, and upwardly against the outer side of said bead-edge portion, as illustrated in Fig. 5, which folding of the friction-fabric strip over and around the bead formation and in adhesive contact therewith provides a further supplementary binder for the cords at the bead edge and serves as a covering and reinforcement therefor.

In the laying of tire fabrics, according to our invention, with round cords or cords or threads of cylindrical cross-section, the cords are laid in substantially the same manner as hereinbefore described with reference to the employment of flat cords and as illustrated in Fig. 1, but the strands of the round cords are laid close together side by side at the bead edge (instead of overlying each other, as in the case of the flat cords), as shown at 15 in Fig. 7, from which side-by-side position they are spread or radiated so that at the tread or periphery they will still be side by side but with a slight intervening space, which latter is filled with a caoutchouc or other suitable compound. This laying of the round cords operates to effectively cover the entire area of the variable circumference of the tire with one lay or ply of the cords and caoutchouc filler. At the looped end 10 the round cords are folded so that they respectively overlie each other and contact with the next adjoining fold at an angle to the annulus of the tire, as shown in Fig. 7, in substantially the same manner as the loops of the flat cords as shown in Fig. 1. In the modification illustrated in Fig. 7, we have shown two plies of laid round cords, the plies being relatively positioned in reverse diagonal or oblique directions in the same manner as before set forth.

In Fig. 8, we have illustrated a modification in which the cords, in lieu of being laid from a continuous length, are laid from single lengths constituting each strand. In these circumstances, the single lengths of cord are not looped at the bead-edge but the terminal ends, 16, of the strands are folded and brought up to the same position as that occupied by the loops heretofore described. This method of laying with single lengths or strands is also especially adapted for the laying of tire fabrics according to our method with the so-called thread-fabrics.

Under circumstances in which it is desired to enlarge the size of the bead, the respective layers of cords may be separated at the bead-edge to leave an intervening space in which is placed a filler, as at 17, of rubber or other suitable caoutchouc compound, to form the central portion of the bead and spread or enlarge the size of the same, as shown in Fig. 9.

In Fig. 10, we have illustrated a modification in the method of laying the cords at the bead-edge, in which the looped ends 10, in lieu of being folded back from the bead-toe and laid against the cord strands (as illustrated in Figs. 1, 7, and other views), are turned from the fold or bend so that they lie at right angles to the main strands of cord and within the bead at the base thereof, as at 18. One special construction as adapted to this method is illustrated in Fig. 10, in which a two-ply fabric is employed with the respective plies separated to form the intervening space at the bead within which is placed the filler 17 to spread or enlarge the bead, and having the looped ends of the respective plies turned inwardly in opposite directions at the base of the bead beneath the filler.

A modification in the construction according to the modified method as above set forth and shown in Fig. 10 is illustrated in Fig. 11, in which the respective plies are not separated at the bead but are laid continuously in superposed position to the bead-toe, and the looped ends 10 of the respective plies are turned downwardly at right angles to the main strands of the cord fabric and are laid in superposed position at the base of the bead beneath the enlarging or spreading filler 17, as shown at 19. (Fig. 11.)

In both the constructions according to the modified method of laying the looped ends as shown in Figs. 10 and 11, the tension of the laid cords is effectively maintained under the initial condition in which they are laid, as the folded looped ends are clamped in position within the mold.

In Figs. 12, we have illustrated a construction especially adapted for clencher rims, as produced according to our improved method. In one type of such construction as herein shown the two plies of cord are laid in substantially the same manner as hereinbefore described and as shown in Figs. 1 and 7, and a suitable filler of caoutchouc or other rubber compound is placed outside the looped ends of the cords at the bead-edge and is covered and inclosed by the friction-fabric strip 5. This filler, as at 20, is of suitable contour to form a bead adapted for clencher rims and also affords the requisite elasticity to enable the placement of the tire-bead over the rim edge.

In producing tire fabrics according to our present improved method, we provide also for increasing the tension on the cords or threads over the degree of tension in which they are initially laid, which increase and equalizing of the initial tension is desirable under some conditions, and we have illustrated in Fig. 14 means whereby this may be accomplished in carrying out our method. In the circumstances as just stated, the flange-rings 3 are of greater diameter in their relation to the core 1 than are the flange-rings as hereinbefore described and as shown in Fig. 3. The increased diameter is such that the flange-rings extend up on the sides of the core beyond the toe of the tire-bead, and the friction-fabric strip 5 is not laid between the periphery of the ring and the core but is laid at the outer side of the ring, and is held in place by a supplementary flange-ring, 21, suitably mounted and retained in position parallel to the outer side of the flange-ring 3 and over the friction-fabric strip. The diameter of the supplementary ring 21 corresponds to that of the bead-toe at which point the cords or threads are folded back, at 12, as herein previously described, and the outer face of the ring at its periphery is preferably beveled toward the periphery, as at 22. In laying the cord under these conditions, the length of the strands of cord required to extend from the point of the fold 12 at one side of the core 1 to the corresponding point on the opposite side thereof is less than under the circumstances in which the bead is built up against the core according to the construction and means as heretofore set forth and illustrated in Fig. 3, as the main flange-ring 3 in the present instance extends to a higher point at the side of the core and the bead is formed over the extended peripheral portion of the flange-ring. Then, when the flange-rings have been removed from their position with relation to the core, the bead is forced inwardly against the core to the point, indicated at 23, which would be the position of the fold if the lesser-diameter flange-ring as shown in Fig. 3 were employed, and this operation stretches or extends the cords or threads and thus increases and equalizes the tension beyond that under which they were initially laid. In effecting the result just stated, the increased-diameter main flange-ring 3 forms practically an extension of the side of the core 1, to carry that portion of the friction-fabric strip 5 against which the cords are pressed to create an adhesive bond and to maintain the tension under which the cords are initially laid over the core 1, which extension produced by the removable flange-ring increases the diameter of the core at the point where the cords or threads are folded back, at 12, and thus requires a lesser length in the strands of cord which extend between the folds 12 at the opposite sides of the core. It will therefore be understood that, when the flange-ring is removed and the laid cords are then brought inwardly after being bonded to the friction-fabric strip and thus secured in their initial tension, at the point of the fold 12 and against the core at the normal point 23, the movement increases the required length of the strand of cords between the folds 12 at opposite sides of the core and therefore causes the stretching or increasing the length of the strands of cords which produces an increased tension thereon supplementary to the tension in which they were initially laid and bonded to the friction-fabric strip, and this latter increased tension is maintained in the further formation of the bead construction and the final application of the friction-fabric strip and in the mold as hereinbefore set forth.

The practice of our improved method, and the advantages produced thereby, will be readily understood by those skilled in the art to which our invention appertains. The method enables the laying of the cord or threads rapidly and in a simple and efficient manner, and the effective and convenient formation of the bead-edge construction in connection with the friction-fabric strip, and coincident with the laying and formation of the bead the cords or threads are securely maintained in the condition of tension under which they are laid by the cohesive bonds which are established by our improved method between the friction-fabric strip and between the laid cords.

We do not desire to be understood as limiting ourselves to the detail features of the method of construction as herein illustrated and described, as it is manifest that variations therein may be resorted to in the adaptation of the method of construction to varying conditions according to the type of pneumatic tire casing to which the cord body fabric as produced by our method is to be applied, without departing from the spirit and scope of our invention and improvements. We therefore reserve the right to all such variations and modifications as properly fall within the scope of our invention and the terms of the following claims.

Having thus described our invention, we claim and desire to secure by Letters Patent:

1. The method of constructing the internal body fabric for the shoe or casing of pneumatic tires, which comprises laying a continuous length of cord or thread back and forth over a core or mandril to produce loops at the side edges of the cord fabric at the bead-edge portion, the continuous length of cord being turned upon itself to form said side-edge loops, and locating a friction-fabric strip in retained position at a point under the length of cord and immediately beyond the looped-edge portion, the cord being placed in its successive lay in contact with said friction-fabric strip and retained thereby in said position with the looped side edges of the cord fabric initially extending in free position beyond said strip.

2. The method of constructing the internal body fabric for the shoe or casing of pneumatic tires, which comprises laying a continuous length of cord or thread back and forth over a core or mandril to produce loops at the side edges of the cord fabric at the bead-edge portion, the continuous length of cord being turned upon itself to form said side-edge loops, and locating a friction-fabric strip in retained position at a point under the length of cord and immediately beyond the looped-edge portion, the cord being placed in its successive lay in contact with said friction-fabric strip and retained thereby in laid position with the looped side edges of the cord fabric initially extending in free position beyond said strip, and then turning said looped edges beyond said friction-fabric strip at an angle to the portion of the cord fabric which is secured to said strip.

3. The method of constructing the internal body fabric for the shoe or casing of pneumatic tires, which consists in laying a length of cord or thread over a core or mandril, and locating a friction-fabric strip in retained position under the length of cord and immediately beyond the edge thereof at the bead-edge portion, the cord being placed in its lay in contact with said friction-fabric strip and retained thereby in laid position with the bead-edge portion initially extending in free position beyond said strip, and said strip having a free portion extending beyond its contact with the cord, then turning the bead-edge portion of the length of cord beyond said friction-fabric strip at an angle to the portion which is secured to said strip, and then turning the free portion of said friction-fabric strip around the turned edge portion of the cord and in contact therewith.

4. The method of constructing the internal body fabric for the shoe or casing of pneumatic tires, which comprises laying a length of cord or thread over a core or mandril, and locating a friction-fabric strip in retained position under the length of cord and immediately beyond the edge thereof at the bead-edge portion, the cord being placed in its lay in contact with said friction-fabric strip and retained thereby in laid position with the bead-edge portion initially extending in free position beyond said strip, and then folding the free edge portion of the length of cord beyond said friction-fabric strip outwardly and upwardly against the bead-edge portion of the length of cord which is in contact with the friction-fabric strip.

5. The method of constructing the internal body fabric for the shoe or casing of pneumatic tires, which comprises laying cords or threads over a core or mandril, and locating a friction-fabric strip in retained position at a point under the length of cord and immediately beyond the side edges thereof, the cord being placed in its lay in contact with said friction-fabric strip and retained thereby in laid position with its side edges extending in free position beyond said strip, and then folding the end portions of the cords or threads beyond said friction-fabric strip into a loop and laying said looped ends at an angle to the portion which is secured to said strip.

6. The method of constructing the internal body fabric for the shoe or casing of pneumatic tires, which comprises laying cords or threads over a core or mandril, and locating a friction-fabric strip in retained position at a point under the length of cord and immediately beyond the side edges thereof, the cord being placed in its lay in contact with said friction fabric strip and retained thereby in laid position with its side edges extending in free position beyond said strip, and the cords being laid so that they relatively diverge in a continuous gradual and radial spread from the bead edge to the tread portion, and then turning the ends of the cords or threads beyond said friction fabric strip at an angle to the portion which is secured to said strip.

7. The method of constructing the internal body fabric for the shoe or casing of pneumatic tires, which comprises laying cords or threads over a core or mandril, and locating a friction-fabric strip in retained position at a point under the length of cord and immediately beyond the side edges thereof, the cord being placed in its lay in contact with said friction-fabric strip and retained thereby in laid position with its side edges extending in free position beyond said strip, and the cords being laid so that each succeeding strand overlies the preceding strand and said strands relatively diverge in a continuous gradual and radial spread from the bead edge to the tread portion and entirely cover the increasing progressive variable circumference of the tire between the bead and tread with one lay or ply of the cords, and then turning the ends of the cords or threads beyond said friction-fabric strip at an angle to the portion which is secured to said strip.

8. The method of constructing the internal body fabric for the shoe or casing of pneumatic tires, which comprises laying cords of threads over a core or mandril, and locating a friction-fabric strip in retained position at a point under the length of cord and immediately beyond the side edges thereof, the cord being placed in its lay in contact with said friction-fabric strip and retained thereby in laid position with its side edges extending in free position beyond said strip, and the cords being laid so that each succeeding strand overlies the preceding strand and said strands relatively diverge in a continuous gradual and radial spread from the bead edge to the tread portion and entirely cover the increasing progressive variable circumference of the tire between the bead and tread with one lay or ply of the cords, and then folding the end portions of the cords or threads beyond said friction-fabric strip into a loop and laying said looped ends at an angle to the portion which is secured to said strip.

9. The method of constructing the internal body fabric for the shoe or casing of pneumatic tires, which comprises laying a layer or ply of cords or threads over a core or mandril diagonally or at an angle to the transverse plane of the tire, and locating a friction-fabric strip in retained position at a point under the length of cord and immediately beyond the side edges thereof, the cord being placed in its lay in contact with said friction-fabric strip and retained thereby in laid position with its side edges extending in free position beyond said strip, turning the ends of the cords or threads beyond said friction-fabric strip at an angle to the portion which is secured to said strip, laying a superposed layer or ply of cords or threads in a diagonal or oblique position reverse to that of said underlying layer, and turning the ends of the cords or threads at the bead-edge of said superposed layer at an angle to the strands thereof.

10. The method of constructing the internal body fabric for the shoe or casing of pneumatic tires, which consists in laying a layer or ply of cords or threads over a core or mandril diagonally or at an angle to the transverse plane of the tire, and locating a friction-fabric strip in retained position under the length of cord and immediately beyond the edge thereof at the bead-edge portion, the cord being placed in its lay in contact with said friction-fabric strip and retained thereby in laid position with the bead-edge portion initially extending in free position beyond said strip, and said friction-fabric strip having a free portion extending beyond its point of contact with the cord, then turning the bead-edge portion of the length of cord beyond said friction-fabric strip at an angle to the portion which is secured to said strip, laying a superposed layer or ply of cords or threads in a diagonal or oblique position reverse to that of said underlying layer, turning the side edges of the cord at the bead-edge of said superposed layer at an angle to the strands thereof, and then turning the free portion of said friction-fabric strip around the bead-edge portion which comprises said turned edges of the superposed layers.

11. The method of constructing the internal body fabric for the shoe or casing of pneumatic tires, which consists in laying a length of cord or thread over a core or mandril, and locating a friction-fabric strip in retained position under the length of cord and immediately beyond the edge thereof at the bead-edge portion, the cord being placed in its lay in contact with said friction-fabric strip and retained thereby in laid position with the bead-edge portion initially extending in free position beyond said strip, and then turning the bead-edge portion of the length of cord beyond said friction-fabric strip around a reinforcing ring or hoop and at an angle to the portion which is secured to said strip.

12. The method of constructing the internal body fabric for the shoe or casing of pneumatic tires, which comprises laying cords or threads over a core or mandril, and locating a friction-fabric strip in retained position at a point under the cords and immediately beyond the side edges thereof, the cords being placed in their lay in contact with said friction-fabric strip and retained thereby in laid position with the side edges extending in free position beyond said strip, and then folding the end portions of the cords or threads beyond said friction-fabric strip around a reinforcing ring or hoop and into a loop and laying said looped ends at an angle to the portion which is secured to said strip.

13. The method of constructing the internal body fabric for the shoe or casing of pneumatic tires, which comprises laying cords or threads under tension over a core or mandril with the bead-edge portion in contact with a friction-fabric strip, and then moving the portion of the cords which is anchored to said friction-fabric strip in a plane which will stretch or lengthen the cords and increase and equalize the initial condition of tension.

14. The method of constructing the internal body fabric for the shoe or casing of pneumatic tires, which consists in laying cords or threads under tension over a core or mandril with the bead-edge portion in contact with a friction-fabric strip, said strip having a free portion extending beyond its contact with the cord, then moving the portion of the cords which is anchored to said friction-fabric strip in a plane which will stretch or lengthen the cords and increase and equalize the initial condition of tension, and then turning the free portion of said friction-fabric strip around the bead-edge portion and in contact therewith to maintain said increased tensional status.

15. The method of constructing the internal body fabric for the shoe or casing of pneumatic tires, which consists in laying cords or threads over a core or mandril under an initial condition of tension and securing said initial tension by bringing the bead-edge porton of the cords or threads in contact with a friction-fabric strip which is in secured position with relation to the core or mandril, and then moving the portion of the cords which is anchored to said friction-fabric strip in a plane which will stretch or lengthen the cords and increase and equalize the initial condition of tension.

16. The method of constructing the internal body fabric for the shoe or casing of pneumatic tires, which consists in laying cords or threads over a core or mandril under an initial condition of tension and securing said initial tension by bringing the bead-edge porton of the cords or threads in contact with a friction-fabric strip which is initially in secured position with relation to the core or mandril, then moving the portion of the cords which is anchored to said friction-fabric strip in a plane which will stretch or lengthen the cords and increase and equalize the initial condition of tension, and then turning the free portion of said friction-fabric strip around the bead-edge portion and in contact therewith to maintain said increased tensional status.

17. The method of constructing the internal body fabric for the shoe or casing of pneumatic tires, which consists in laying cords or threads over a core or mandril in secured position, and then folding the end portions of the cords or threads at the bead-edge into a loop and laying said looped ends at an angle to the main strands.

18. The method of constructing the internal body fabric for the shoe or casing of pneumatic tires, which consists in laying cords or threads over a core or mandril and in secured position so that they relatively diverge in a continuous gradual and radial spread from the bead-edge to the tread portion and extend diagonally or at an angle to the transverse plane of the tire, and then folding the end portions of the cords or threads at the bead-edge into a loop and laying said looped ends in contact and in overlying position and in contact with the underlying strands and in a diagonal or oblique position at an angle to the lay of the main portion of the length of cord.

In testimony whereof we have signed the foregoing specification.

FREDRICK S. DICKINSON.
JOHN SPRINGER.